Nov. 9, 1926.
C. MICHAEL
AUTOMATIC TIME SWITCH
Filed Sept. 15, 1924
1,606,656
3 Sheets-Sheet 1
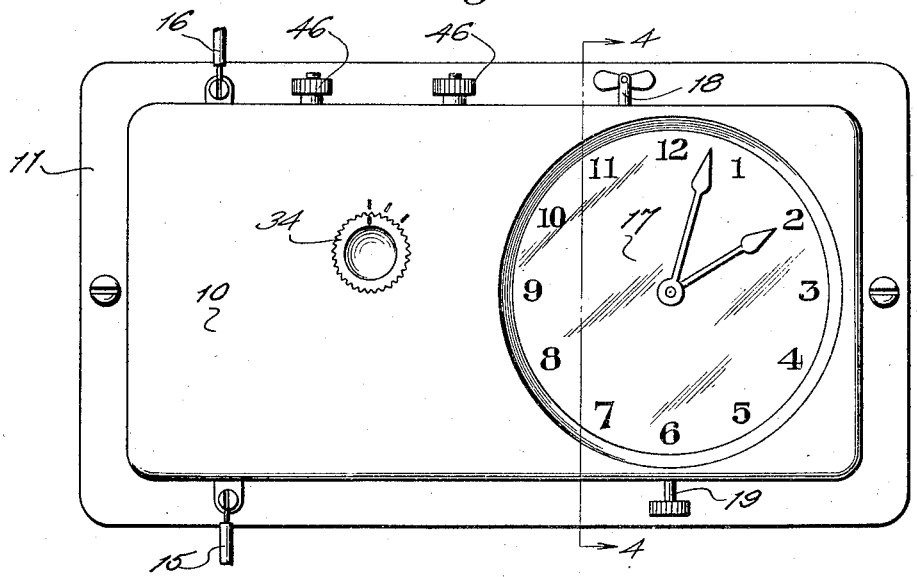
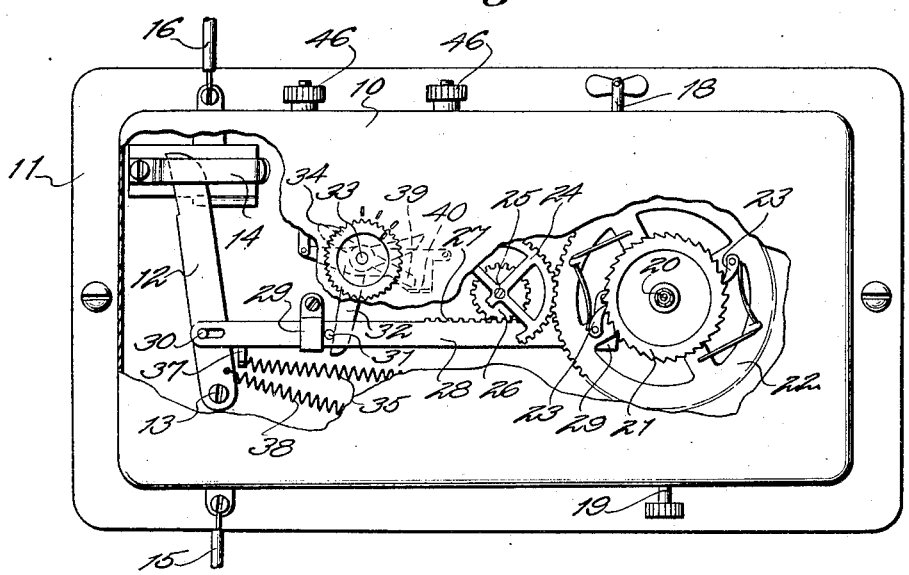
Casper Michael
INVENTOR
BY Victor J. Evans
ATTORNEY
WITNESS:

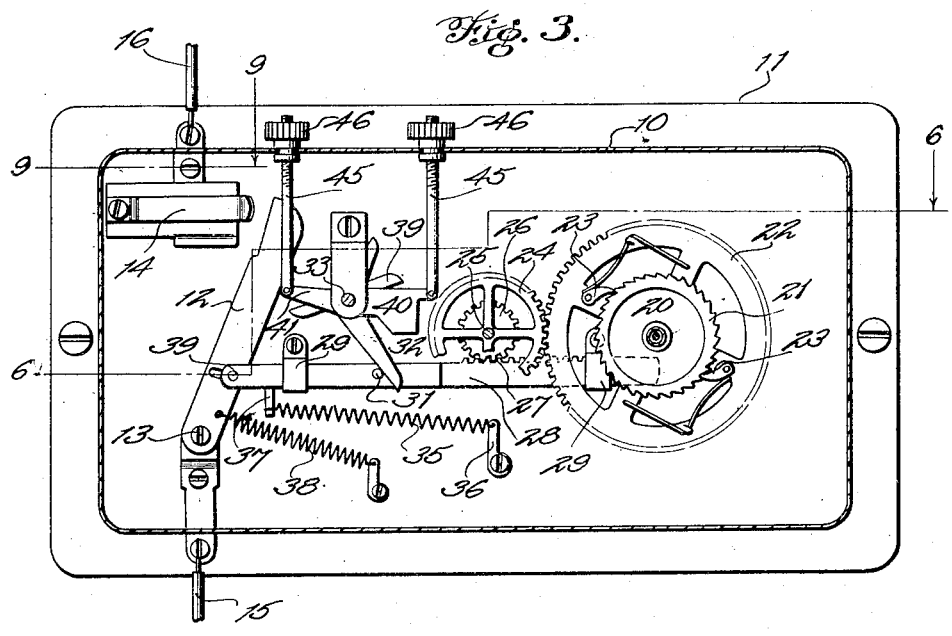

Nov. 9, 1926.  1,606,656
C. MICHAEL
AUTOMATIC TIME SWITCH
Filed Sept. 15, 1924  3 Sheets-Sheet 3
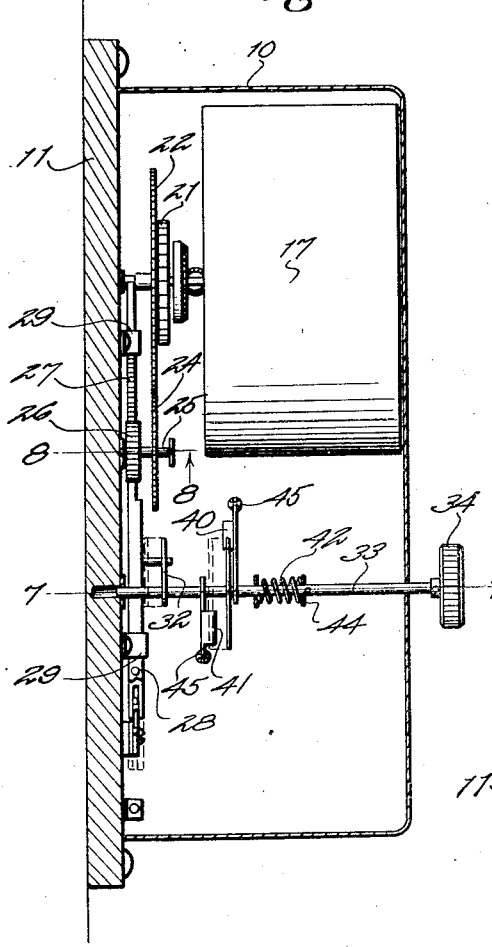
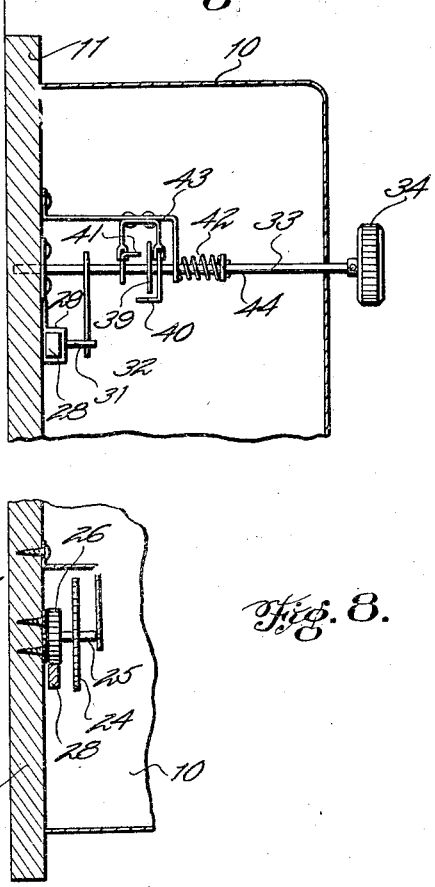
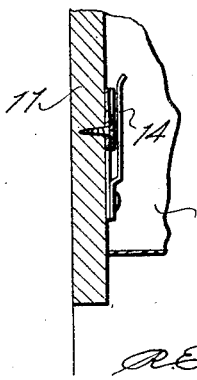
Casper Michael
INVENTOR Patented Nov. 9, 1926.

1,606,656

UNITED STATES PATENT OFFICE.

CASPER MICHAEL, OF GRACEVILLE, MINNESOTA.

AUTOMATIC TIME SWITCH.

Application filed September 15, 1924. Serial No. 737,911.

This invention relates to electrically operated milk testing machines, but more particularly to a time controlled switch for automatically stopping the machine at any desired and predetermined time, thus allowing the user of the machine to devote his time and attention to other things without the danger of the machine remaining in operation for a longer time than desired.
In carrying out the invention I provide a switch mechanism which is susceptible of adjustment, so that it can be regulated to allow the machine to operate for any predetermined period of time.
The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 1 is a view in elevation of the time controlled switch forming the subject matter of the invention.

Figure 2 is a similar view partly in section showing the mechanism of the switch.

Figure 3 is a view similar to Figure 2, but showing the arrangement of parts when the circuit is opened.

Figure 4 is a transverse sectional view taken on line 4—4 of Figure 1.

Figure 5 is a sectional view taken on line 5—5 of Figure 4.

Figure 6 is a sectional view taken on line 6—6 of Figure 3.
Figure 7 is a sectional view taken on line 7—7 of Figure 6.

Figure 8 is a sectional view taken on line 8—8 of Figure 6.

Figure 9 is a sectional view taken on line 9—9 of Figure 3.

The time controlled switch mechanism forming the subject matter of the present invention is adapted to be arranged within a casing 10 which is mounted on a suitable base 11. The switch proper includes a movable switch element 12 which is pivoted as at 13 and which element is adapted to be moved behind the resilient switch element 14 when it is desired to close the circuit to the machine to be operated. As hereinabove stated the invention is primarily intended for use in conjunction with an electrically operated milk testing machine (not shown), the electric wires being indicated at 15 and 16 respectively, the latter leading to the machine above referred to. When it is desired to put said machine into operation, the switch element 12 is moved into engagement with the switch element 14 to close the circuit as will be readily understood, but the invention provides means for separating these elements 12 and 14 to stop the machine automatically after the machine has operated for a predetermined length of time. The separation of the switch elements is controlled by a clock mechanism to be hereinafter described.

The clock is indicated generally at 17 and is adapted to be wound and set by the usual mechanism including shafts 18 and 19 respectively. Fixed upon the arbor 20 for rotation therewith is a ratchet wheel 21, while loosely mounted on the shaft immediately adjacent said ratchet wheel is a gear 22. The gear 22 has pivoted thereon a pair of spring pressed pawls 23 which cooperate with the teeth of the ratchet wheel 21 to gradually retard the movement of the switch element 12 while it is being separated from the switch element 14. Meshing with the gear 22 is a small gear 24 the latter being mounted upon a stub shaft 25, which also supports a pinion 26. The pinion 26 meshes with the teeth 27 of a rack bar 28, the latter being mounted for sliding movement through suitable space guides 29 shown in Figure 3. The rack bar is associated with the movable contact 12 by means of a slot and pin connection 30, and consequently it is the reciprocatory movement of this rack bar that moves the switch element 12 into and out of engagement with the cooperating switch element 14. Projecting from the rack bar is a pin 31 which is normally engaged by a finger 32 projecting from a shaft 33, the latter being arranged above and at a right angle to the rack bar, and projecting through the casing 10 so that it can be easily rotated by means of a knob 34. Manifestly when the shaft 33 is turned in one direction, the finger 32 contacting the pin 31 moves the rack bar 28 to the position shown in Figure 2, thus positioning the contact 12 behind the cooperating contact 14 of the switch. As long as these contacts remain in contacting engagement with each other, the circuit is closed and the milk testing machine above referred to put in operation. However, the switch element 12 is arranged in contacting engagement with the switch element 14 in the manner just described, against the tension of a coil spring 35, which spring is fixed at one end in any suitable manner as at 36, while the opposite end of this spring is connected with a lug 37 projecting from the rack bar 28. Therefore this spring 35 when placed under tension is utilized to move the rack bar in a reverse direction, so that the switch element 12 will be ultimately separated from the switch element 14, thus opening the circuit and causing the machine with which the switch is used to stop. When the switch element 12 is moved to its active position by turning the shaft 33 as above stated, the small gear 24 meshing with the gear 22 rotates the latter during which rotation of said wheel the spring pressed pawls 23 idle over the ratchet wheel 21, the latter continuing to rotate with the clock arbor 20. Now, the machine will remain in operation until the switch element 12 is separated from the switch element 14 by means of the spring 35, which operates to move the rack bar 28 in the proper direction for this purpose. But after the wheel 22 ceases to rotate in the direction indicated by the arrow in Figure 3, the spring pressed pawls engage the ratchet wheel 21, so that the gear 22 cannot rotate any faster in a reverse direction, than the rotation of the ratchet wheel 21. In other words the ratchet wheel 21 and the gear wheel 22 rotate in unison, when rotating in the same direction. Consequently this retards the movement of the rack bar 28 in a direction to effect a separation of the switch elements 12 and 14 respectively.

Now, the period of time during which the said machine is allowed to operate, depends upon the time required for the switch element 12 to be separated from the switch element 14, and obviously the time required for this latter operation depends upon how far the element 12 must travel to separate itself from the element 14. By regulating the degree of movement imparted to the rack bar 28 by means of the shaft 33 the position ultimately occupied by the switch element 12 with relation to the switch element 14 can be varied, and in this way the said element 12 can be arranged either in the position shown in Figure 2, or in a position closer to the free end of the element 14, from which latter mentioned position it can be separated from said element 14 in a very short time. The switch element 12 has connected therewith a spring 38 which is utilized to cause the element to quickly separate itself from the element 14 when it nears the free end thereof.

For regulating the degree of movement imparted to the rack bar 28 incident to the rotation of the shaft 33, I make use of an arm 39 which is supported by the shaft 33 to project from the opposite sides thereof. Used in connection with this arm 39 is a pair of stop elements 40 and 41 the latter being arranged at opposite sides of the arm 39 as shown in Figure 7, and adapted to cooperate with said arm to limit the rotation of the shaft 33 and at the same time limit the degree of movement imparted to the rack bar 38 by the finger 32 when the shaft 33 is rotated for this purpose. Surrounding the shaft 33 is a coil spring 42 one end of which bears against a bracket 43 and the other end against a washer 44 mounted on said shaft 33. This spring is tensioned to normally hold the arm 39 closer to the stop 40 than the stop 41, inasmuch as the arm 39 normally cooperates with the stop 40 to limit the movement of the rack bar 28 in one direction, and the ultimate position of the switch element 12 with relation to the element 14. When it is desired to run the machine with which the switch is used for a considerable length of time, the stop 40 is used to limit the rotation of the shaft 33 when it is turned in a direction to throw in the switch. Consequently the switch element 12 is allowed to pass behind the switch element 14 to the limit of its movement in this direction as shown in Figure 2, and thus require a predetermined period of time before it can be separated from said element 14 by means of the springs 35 and 38 respectively. If on the other hand it is desired to operate the machine for a short period of time, the stop 41 is used, and in order to make use of this stop, it is necessary to position the arm 39 so that it will contact the stop 41 when the shaft is rotated in a direction to throw in the switch. Consequently the shaft 33 must be pushed inwardly against the tension of the spring 42 to arrange the arm 39 with relation to the stop 41 for the purpose above mentioned, and when the parts are thus arranged, the shaft 33 can be only rotated a slight distance, thus moving the switch element 12 behind the element 14 but close to the free end thereof, so that it can be separated from the element to stop the machine in quick order. In operating milk testing machines, it is frequently desirable to operate the machine for approximately four or five minutes, after which the machine is stopped. Then each test bottle used in conjunction with the machine is partly filled with hot water so as to bring the bottom of the fat up in the neck of the bottle and subsequently operate the machine for approximately two or three minutes. The stop 40 is used with the arm 39 when the machine is initially operated for the greatest period of time, while the stop 41 is used when it is desired to operate the machine for the shortest period of time. In either instance, the invention provides means whereby the machine can be set through the instrumentality of the switch, so that the machine will automatically stop after it has been in operation a predetermined length of time, and thus does not require the attention of the user or operator for this purpose, permitting him to devote his time and attention to other things with the assurance that the machine will not remain in operation for a period of time longer than that for which the machine has been set for operation.

It is possible to adjust the stops 40 and 41 so that the machine can be operated for different predetermined intervals, and it will be noted upon inspection of Figure 3 that each stop is mounted for pivotal movement and associated with an adjusting rod 45 which is threaded for a portion of its length, so that by turning the adjusting nut 46, the said stop can be moved toward or away from the arm 39, to allow the shaft 33 and the rack bar 28 to be moved different distances, depending upon how long it is desired to operate the machine. In this way the contact element 12 can be positioned at different points along the length of the contact element 14, to require different periods of time to effect a separation of these elements, which fact controls the period of time during which the machine is allowed to operate.

In practice, the switch is operated as follows: Assume that the parts are arranged as shown in Figure 3, and it is desired to close the circuit to the milk testing machine above referred to. It is first determined how long it is desired to have the machine operate, and the stop 40 or 41 is adjusted accordingly, depending of course upon which stop it is intended to use. Then the shaft 33 is rotated in a direction to cause the finger 32 which engages the pin 31 to move the rack bar 28 in a direction of the body of the switch, during which movement of the rack bar 28, the switch element 12 is slipped behind the switch element 14. The ultimate position of the switch element 12 with relation to the element 14 is regulated by the degree of movement of the rack bar 28, and as these elements are being associated to close the circuit, the spring 35 and spring 38 are placed under tension. The movement of the rack bar 28 rotates the gear 24, and the latter in turn rotates the large gear wheel 22 in a direction opposite from the direction of rotation of the ratchet wheel 21, both of which are supported upon the arbor 20 of the clock. Just as soon as the switch element 12 is arranged in contacting engagement with the element 14, the switch is closed and the machine put in operation, and at the same time the spring 35 is called into use to effect a separation of said switch elements to stop the machine. The spring 35 exerts a pull upon the rack bar 28 to return it to its normal position such as shown in Figure 3, but the rack bar is retarded in its movement in this direction, due to the fact that the gear 22 cannot rotate upon the arbor 20 of the clock any faster than the ratchet wheel 21, with which it is now associated for rotation in unison therewith, by means of the pawls 23. Therefore the machine will remain in operation just as long as it takes the spring 35 to separate the switch element 12 from the switch element 14, this being controlled by the time mechanism of the clock. However as the switch element 12 nears the free end of the switch element 14, the spring 38 tends to quickly separate the elements as above described.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:

1. In a switch of the character described, a resilient contact, a pivoted contact mounted for movement toward and away from the resilient contact, a rack bar connected with the pivoted contact, a pin projecting from the rack bar, a shaft mounted for rotation, an arm carried by the shaft and cooperating with said pin to move the rack bar in one direction, whereby the pivoted contact is moved into engagement with the resilient contact, yieldable means connected with the rack bar to move the latter in an opposite direction and separate said contacts, a pinion meshing with the rack bar, an escapement for operating said pinion, and gradually retarding the movement of the rack bar under the influence of said yieldable means, whereby the switch remains closed for a predetermined time, a second arm carried by said shaft, stop elements arranged at the opposite sides of said arm, said shaft being also mounted for sliding movement to arrange the arm to engage either of said stops to limit the rotation of said shaft, whereby the pivoted contact can be arranged at different points along the resilient contact for the purpose specified.

2. In a switch of the character described, a fixed resilient contact, a pivoted contact, a rack bar terminally connected with the pivoted contact, a shaft mounted for rotation, a connection between the shaft and said rack bar whereby the latter is operated to move the pivoted contact into engagement with the fixed contact, when said shaft is rotated in one direction, resilient means connected with the rack bar for moving the latter in an opposite direction to separate the contacts, a clock escapement including a pinion meshing with the rack bar to gradually retard the movement of the latter under the influence of the yieldable means, whereby the switch remains closed for a predetermined period, an arm projecting from said shaft, stops arranged at the opposite sides of said arm and adapted to be singly engaged by the latter, to limit the rotation of said shaft, said shaft being capable of sliding movement to position said arm in proper relation to either stop, means supporting said stops for pivotal movement, whereby their positions can be varied with relation to said arm, to permit different degrees of rotation of said shaft, whereby the movable contact can be arranged at different points along the fixed contact, and thus vary the time required to separate the contacts, and means for imparting pivotal movement to said contacts.

In testimony whereof I affix my signature.

CASPER MICHAEL.